United States Patent
Maxwell, III et al.

(10) Patent No.: US 11,599,709 B2
(45) Date of Patent: Mar. 7, 2023

(54) NATURAL LANGUAGE WEB BROWSER

(71) Applicant: Palo Alto Research Center Incorporated, Palo Alto, CA (US)

(72) Inventors: John T. Maxwell, III, Santa Clara, CA (US); Kyle D. Dent, San Carlos, CA (US); Daniel G. Bobrow, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 261 days.

(21) Appl. No.: 15/159,048

(22) Filed: May 19, 2016

(65) Prior Publication Data

US 2017/0337177 A1 Nov. 23, 2017

(51) Int. Cl.
| | | |
|---|---|---|
| *G06F 16/00* | (2019.01) | |
| *G06F 40/143* | (2020.01) | |
| *G06F 16/338* | (2019.01) | |
| *G06F 16/22* | (2019.01) | |
| *G06F 16/33* | (2019.01) | |
| *G06F 16/9535* | (2019.01) | |
| *G06F 40/205* | (2020.01) | |

(52) U.S. Cl.
CPC ........ *G06F 40/143* (2020.01); *G06F 16/2246* (2019.01); *G06F 16/338* (2019.01); *G06F 16/3344* (2019.01); *G06F 16/9535* (2019.01); *G06F 40/205* (2020.01)

(58) Field of Classification Search
CPC combination set(s) only.
See application file for complete search history.

(56) References Cited

U.S. PATENT DOCUMENTS

| | | | |
|---|---|---|---|
| 7,013,308 B1 * | 3/2006 | Tunstall-Pedoe | ................................ G06F 17/30654 707/709 |
| 2006/0235696 A1 * | 10/2006 | Bennett | .................. G06F 17/27 704/270.1 |
| 2008/0133444 A1 * | 6/2008 | Gao | ........................ G06F 40/49 707/999.005 |

(Continued)

FOREIGN PATENT DOCUMENTS

| | | |
|---|---|---|
| JP | 2006-293830 A | 10/2006 |
| WO | WO 00/05708 A1 | 2/2000 |
| WO | WO 2011/004000 A2 | 1/2011 |

OTHER PUBLICATIONS

EP Search Report dated Oct. 10, 2017 in EP 17170520.5-1507; 8 pg.

(Continued)

*Primary Examiner* — Shyue Jiunn Hwa
(74) *Attorney, Agent, or Firm* — Burns & Levinson LLP; Steven M. Mills

(57) ABSTRACT

Described are natural language web browsers configured to provide a natural language interface to an existing web browser or a newly created web browser. That is, users interact with the web browser employing speech (or text) as input and output instead of using a mouse and keyboard as input and an electronic display screen as output. Embodiments of a natural language web browser converts user questions, statements, and/or commands into actions, reads the resulting HTML and converts the HTML into natural language descriptions to provide to the user.

18 Claims, 8 Drawing Sheets

(56) References Cited

U.S. PATENT DOCUMENTS

| | | | | |
|---|---|---|---|---|
| 2011/0119302 A1* | 5/2011 | Gorman | G06F 17/2705 | 707/771 |
| 2012/0233207 A1* | 9/2012 | Mohajer | G10L 15/063 | 707/769 |
| 2012/0278300 A1* | 11/2012 | Soubbotin | G06F 16/338 | 707/706 |
| 2013/0246050 A1* | 9/2013 | Yu | G10L 15/1822 | 704/9 |
| 2013/0253913 A1* | 9/2013 | Tunstall-Pedoe | G06F 16/24534 | 704/9 |
| 2013/0338995 A1* | 12/2013 | Elkins | G06F 17/28 | 704/2 |
| 2014/0006012 A1* | 1/2014 | Zhou | G06F 17/30654 | 704/9 |
| 2014/0156282 A1* | 6/2014 | Madere | G06F 17/27 | 704/275 |
| 2014/0156567 A1* | 6/2014 | Scholtes | G06N 5/02 | 706/12 |
| 2015/0277846 A1* | 10/2015 | Yen | G06F 16/957 | 715/847 |
| 2016/0048500 A1* | 2/2016 | Hebert | G06F 17/278 | 704/9 |
| 2016/0180438 A1* | 6/2016 | Boston | G06Q 30/0631 | 705/26.7 |
| 2017/0337177 A1* | 11/2017 | Maxwell, III | G06F 17/2247 | |

OTHER PUBLICATIONS

Raggett, et al "Voice Browsers", Internet Citation, Jan. 28, 1998 XP-002238847 http://www.w3.org/TR/1998/NOTE-voice-0128 [retrieved Apr. 16, 2003]; 10 pg.

Esposito, Dom, "How to Make Restaurant Reservations With Siri", Dec. 23, 2012, http://appadvice.com/appnn/2012/12/how-to-make-restaurant-reservat... 4 pgs (accessed Aug. 15, 2016).

Oldman, John, "10 Free Screen Readers For Blind or Visually Impaired Users", Jul. 16, 2012 http://usabilitygeek.com/10-free-screen-reader-blind-visually-impared-users/ 16 pgs (accessed Aug. 18, 2016).

Kara-Louise, ed. "Switching from JAWS to NVDA", May 2, 2016 https://github.com/nvaccess/nvda-community/wiki/SwitchinqFromJawsToNVDA 5 pgs (accessed Aug. 18, 2016).

University Library, University of Illinois at Urbana-Champaign, "Accessibility and Assistive Technology: Dolphin EasyReader", Updated Dec. 14, 2015 http://guides.library.illinois.edu/accessibility-and-assistive-technology 2 pgs (accessed Aug. 18, 2016).

Watson, Leonie, "Basic Screen Reader Commands for Accessibility Testing", Posted Jan. 5, 2015 https://www.paciellogroup.com/blog/2015/01/basic-screen-reader-commands-for-accessibility-testing/ 4 pgs (accessed (Aug. 18, 2016).

Zeest, "Visually Impaired Persons Guide", Posted Feb. 7, 2015 Introduction to Jaws http://vips-guide.blogspot.com/2015/02/introduction-to-jaws.html 2 pgs (accessed Aug. 18, 2016).

* cited by examiner

NATURAL LANGUAGE WEB BROWSER

BACKGROUND

Online searching has become substantially ubiquitous in the modern world. Particularly, searching of the World Wide Web (www) via the Internet allows users to obtain data from enumerable sources from around the world and beyond. In order to more easily access this data, web browsers have been developed to provide an interface between the electronic networks of the Internet and a user employing an intelligent computing device. A web browser or browser is an application software installed on intelligent computing devices to provide access to the World Wide Web. The various existing web browsers obtain the data in the form of web pages from electronic servers, along with necessary files, such as images, videos, etc. Most commonly existing web browsers include software code to interpret these files and then display the files in a visual manner on an electronic display(s). To access the files, a user may type in a URL (Uniform Resource Locator) of a web page in an address bar or input area of a particular web browser in order to access the specific web page being requested.

As more and more devices are interconnected to the Internet, including those that do not include electronic displays such as smart devices that are part of the Internet of Things and wearables, and as natural language processing and automatic speech recognition becomes more reliable, it is desirable to employ natural language processing for web browsing operations. This is also valuable for hands-free environments such as cars, kitchens, and workshops.

BRIEF DESCRIPTION

A natural language web browsing system and method includes a web browser configured to accept natural language input. The web browser is further configured to browse a computer network including a plurality of websites having web pages, parsing the natural language input into at least one of a question, a statement, and a command. The web browser then operates in accordance with the determined and parsed natural language input, and returns results of the web browsing using natural language, wherein the web browsing is accomplished by use of at least a digital processing device.

Optionally the web browser may determine if the natural language input is ambiguous, and will generate a query asking what was meant by the natural language input when the natural language input is determined to be ambiguous. Thereafter, under this optional operation the web browser will receive a same or conceptually similar natural language input as the previously accepted natural language input and then will parse the same or conceptually similar natural language input into at least one of a question, a statement, and a command of the same or conceptually similar natural language input, when the natural language input was determined to be ambiguous.

The method further including providing information related to actions of the web browser that occurred during the natural language web browsing.

The method further including providing information when a current focus of the web browsing has changed.

The method further including wherein the operating of the web browser in accordance with at least one of the determined and parsed natural language input and the same or conceptually similar natural language input, without the method limiting access to web sites on the world wide web.

The method further including wherein the operating includes navigating directly to a particular web page on the World Wide Web not restricted by the method to a preset number of web sites.

The method further including wherein the parsing includes, enumerating web elements of a current web page that has been identified in a current web browsing session; generating potential references for each enumerated web element; finding a best match between segments of the natural language input and the generated potential references; finding a best match between the segments of the natural language input and known question, statement, and command types; and creating an ambiguity when more than one best match of the finding steps is possible.

The method further including wherein the enumerated web elements include at least one of a header section, a first section, and a second section.

The method further including wherein the natural language input includes one of a navigation command, a read command, a summarize command, a describe command, a click command, a type command, a find command, and a search command.

The method further including wherein the natural language input includes a command that is specific to the current web site, such as "add this to my shopping cart".

The method further including wherein the navigation command is performed by directing the web browser to visit a destination named by a universal resource locator (URL) when the destination of the navigation command is a URL destination, setting a focus to the URL destination; and describing the focus to a user.

The method further including wherein visiting the URL destination includes, giving the URL destination to the web browser; loading a selected web page corresponding to the URL destination; and restructuring the selected web page to improve an ability to describe the selected web page.

The method further including wherein the restructuring of the web page includes, creating a tree structure, having tree elements for the loaded web page based on the HTML of the tree structure; finding labels for tree elements in the HTML of the loaded web page; replacing unlabeled HTML document division element, (<div>), with their children; and for a tree element having more than N children, creating a "more" element with the remainder of children elements.

The method further including wherein the describe command further includes, enumerating children of a given web element; generating a simple natural language reference for each child; generating a natural language reference for the given web element; identifying that the given web element reference has a generated list of natural language references; and when the given web element is a URL, optionally identifying a title of the web page.

The method further including wherein if two or more adjacent children have a same natural language reference, replacing them with a group reference.

The method further including wherein the read command further includes, obtaining the text of a given web element; reading each of the children of the given web element and concatenating the reading results with the text of the given web element.

The method further including wherein the summarize command further includes, obtaining the text of a given web element and summarizing the text.

The method further including wherein the click command further includes, directing the web browser to click on a web element; performing a navigation operation if the web element is a link; and otherwise explaining how the web page changed.

The system further includes a communication arrangement having, at least one digital processing device, an electronic storage and an input/output device configured to communicate with a computer network including a plurality of websites having web pages.

PRIOR ART

DETAILED DESCRIPTION

There are personal agents such as Apple's Siri, Microsoft's Cortana, Google Now, and Amazon's Alexa that allow the user to interface with web sites using natural language. For instance, you can use Siri to make restaurant reservations on Open Table (http://appadvice.com/appnn/2012/12/how-to-make-restaurant-reservations-with-siri). However, this only works for particular commands on particular web sites. It doesn't allow you to use natural language to access any web site that a web browser can access. Furthermore, agents such as Apple's Siri are understood to only work if someone writes special code to connect natural language commands to specific actions on the specific web site because it bypasses the HTML and accesses the underlying web services directly. Embodiments of the current systems and methods, as will be expanded upon herein, work for most web sites without any special site-specific code required because the embodiments make use of each specific web site's HTML.

There are also screen readers such as Apple's VoiceOver, NVDA (http://www.nvaccess.org), JAWS (http://www.freedomscientific.com/Products/Blindness/JAWS), Window Eyes (http://www.gwmicro.com/window-eyes/), and Dolphin (http://yourdolphin.com/product?id=3) that are understood to allow vision-impaired people to access web sites without special site-specific code. However, these screen readers use keyboard input to move around a web page rather than natural language input. Furthermore, they do not provide a top-level description of a web site that the user can recursively expand for more details, nor do they allow the user to refer to web elements using natural language expressions in commands (e.g. "click on the submit button").

Described herein are natural language web browsers configured to provide a natural language interface to an existing web browser or a newly created web browser. That is, users interact with the web browser employing speech (or text) as input and output instead of using a mouse and keyboard as input and an electronic display screen as output. Embodiments of natural language web browser converts user questions, statements, and/or commands into actions, reads the resulting HTML and converts the HTML into natural language descriptions to provide to the user.

Figure 1:
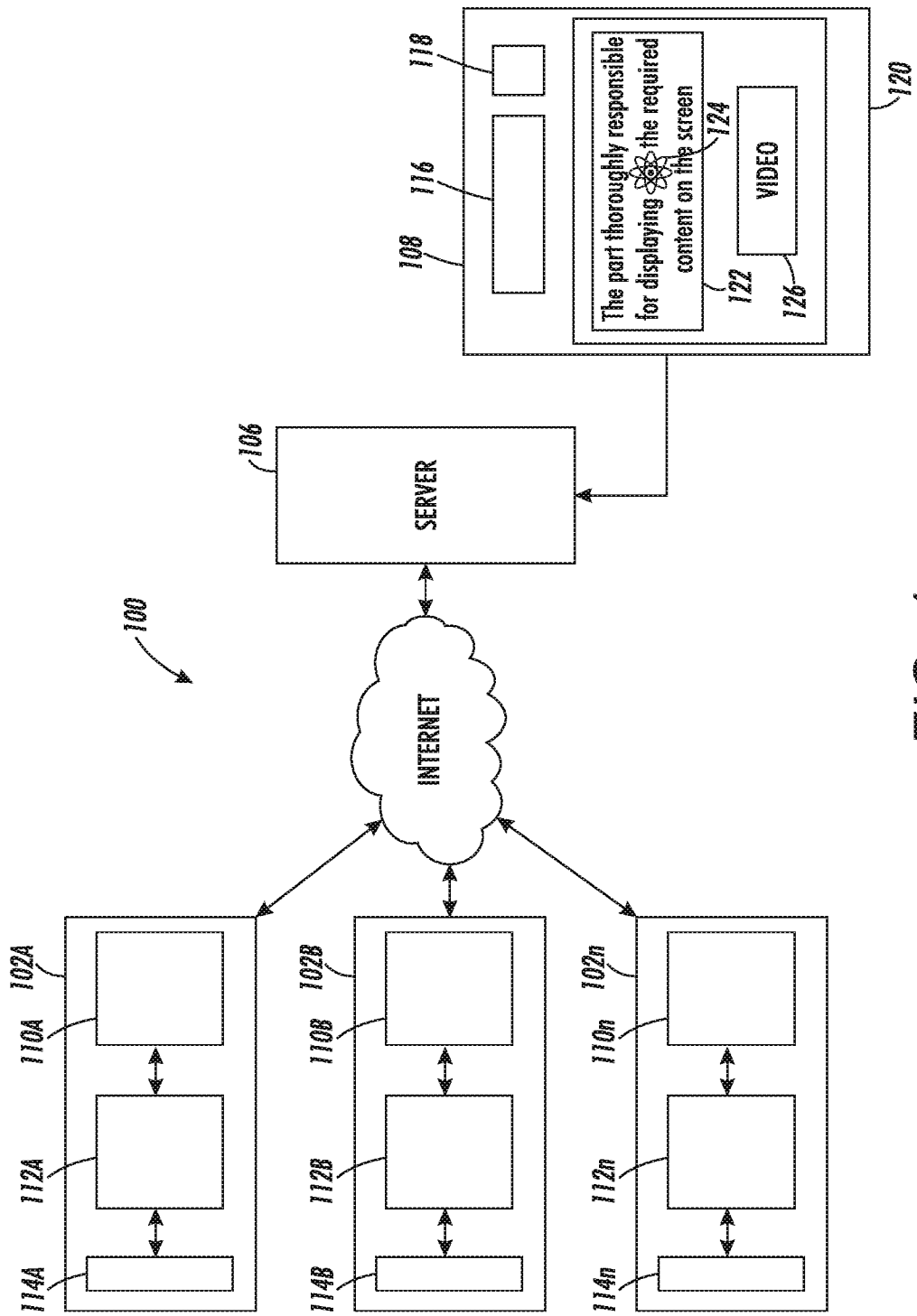
FIG. 1 is a communications network which permits natural language input for web browsing operations.

Turning to FIG. 1 illustrated is an electronic network system 100 for communication across the Internet, including the acquisition and searching of web pages in accordance with concepts for the present application.

More particularly, system 100 shows a plurality of smart electronic computing devices 102a, 102b-102n in operational communication with the Internet 104. In this simplified view, the Internet 104 connects to a server arrangement 106 which includes components for configuring and storing web pages, such as web page 108, and for communicating data (such as web page 108) across the Internet 104 to the smart electronic computing devices 102a-102n. The smart electronic computing devices 102a, 102b-102n are shown to be configured with a computing section 110a, 110b-110n, a web browser 112a, 112b-112n, and a voice interface 114a, 114b-114n (e.g., having automatic voice recognition). The smart electronic computing devices 102a, 102b-102n may be any of a number of electronic devices having computing capabilities, such as but not limited to work stations, laptops, smart phones, portable devices, as well as other devices which have had computing intelligence embedded therein.

The arrangement of FIG. 1 may also be considered an example of an Internet of Things arrangement having smart electronic computing devices that are embedded in thermostats, televisions, automobiles, alarm clocks, wearables, among numerous other devices, which may or may not have electronic displays.

The web browsers 112a, 112b-112n interact with a respective voice interface 114a, 114b-114n to receive a user's natural language inputs which may be in the form of questions, statements, commands, etc. The voice interface 114a, 114b-114n may also be considered an input/output component, as the voice interface is capable of receiving natural language input as well as keyboard input and other presently known manners of inputting. This voice interface will also include a manner of generating a computer generated voice output, as well as optionally including electronic displays for visual representations.

Server 106 represents the multitude of servers that can be part of the World Wide Web. Such servers have structure and components permitting the storage of web pages (e.g., web page 108) and for the transfer of these web pages across the Internet 104 upon use of the proper protocols and processes. For example, a web page will have a Uniform Resource Locator (URL) designation to identify its specific location.

The web pages themselves may be structured and formed by the use of various versions of Hypertext Markup Language (HTML) and transferred via versions of Hypertext Transfer Protocol (HTTP), as is well known in the art.

A web page such as web page 108 may include an input box 116, buttons (e.g., start buttons, stop buttons, forward buttons, back buttons, etc.), such as represented by button 118, content 120, which may include text 122, images or pictures 124, as well as other media, including but not limited to video 126. It is to be understood that this is simply one representation of elements on a web page, and is not intended to be limiting as to the present application. It is mentioned that web pages structured in HTML have a hierarchical arrangement, and such pages will be divided up into labeled sections, including header sections, body sections, and footer sections, among others. While the present discussion primarily discusses web pages formed with HTML, it is understood this is not to be limiting and the present concepts may be applied to other formats. In particular, it can be applied to any User Interface (UI) that provides a document object model that is accessible from outside of the application that it is part of.

Figure 2:
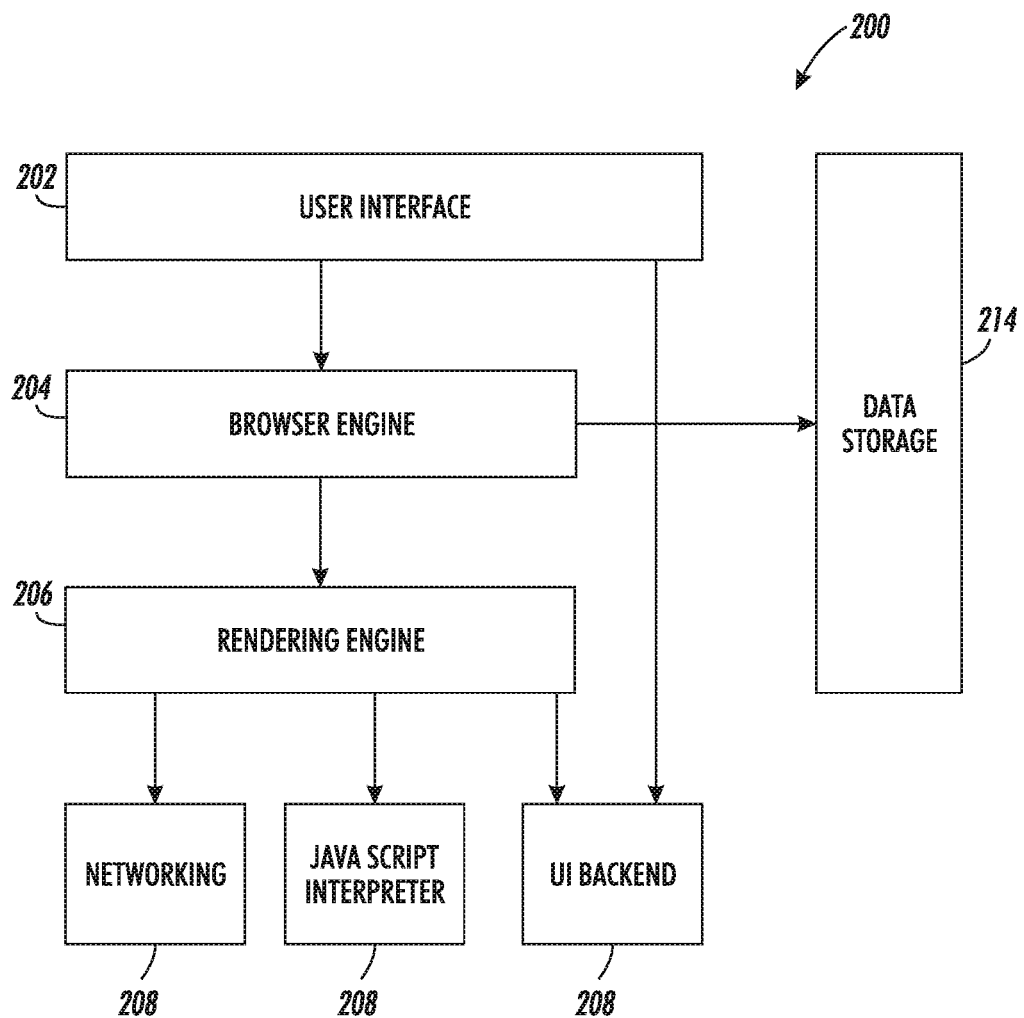
FIG. 2 illustrates a high level version of a web browser modules configuration which implements concepts of the present application.

FIG. 2 illustrates a high level modular concept of a web browser 200 according to the present application.

A primary aspect of a web browser is to present a web resource (e.g., a web page) chosen by a user, by requesting this resource from a server and displaying it in a browser window. This is commonly an HTML document. However, different formats may be obtained, including PDF's, or other types of formatted content. As also previously mentioned in connection with FIG. 1, the resource (e.g., a web page) is located through the use of a URL, or more generically a Uniform Resource Identifier (URI). With more particular attention to FIG. 2, included among the modules of web browser 200 is a user interface 202. In existing systems, a user interface is the arrangement which allows for an interaction between the user and the web browser. Existing types of input capabilities for the interface include an address bar where a user may type in information, backward and forward buttons, refresh buttons, stop buttons and other options. In addition to this, in certain embodiments of the present application, the user interface, as previously discussed in FIG. 1, will have a voice interface which permits the user to speak in a natural language input style, and the system will include a manner of outputting results including, in certain embodiments, a visual display, and in other embodiments, a computer generated voice in order to interact with the user.

A browser engine 204 permits the communication of the input from the user interface to rendering engine 206. The browser engine is responsible for the querying and manipulating of the rendering engine according to input from the user. The rendering engine 206 is responsible for displaying requested content on an electronic display, and/or the outputting of computer generated voice responses. It is commonly the engine which will parse the HTML tags and then will build a rendering tree and finally a rendered layout, which identifies what could be displayed on a screen, and/or spoken in a computer generated voice to a user.

A further module is a networking module 208 through which various network calls will be sent, for example the sending of an HTTP request to a server. In certain web browsers, a Java script interpreter module 210 is used to interpret Java script code that may be presented in a web page. The UI (User Interface) backend module 212 is used to draw basic widgets, such as boxes, windows, among others. Finally, a data storage module 214 is a persistence layer that is a small database created on a local drive of the smart electronic computing device. This database may store a variety of files such as cache, cookies, etc.

Figure 3:
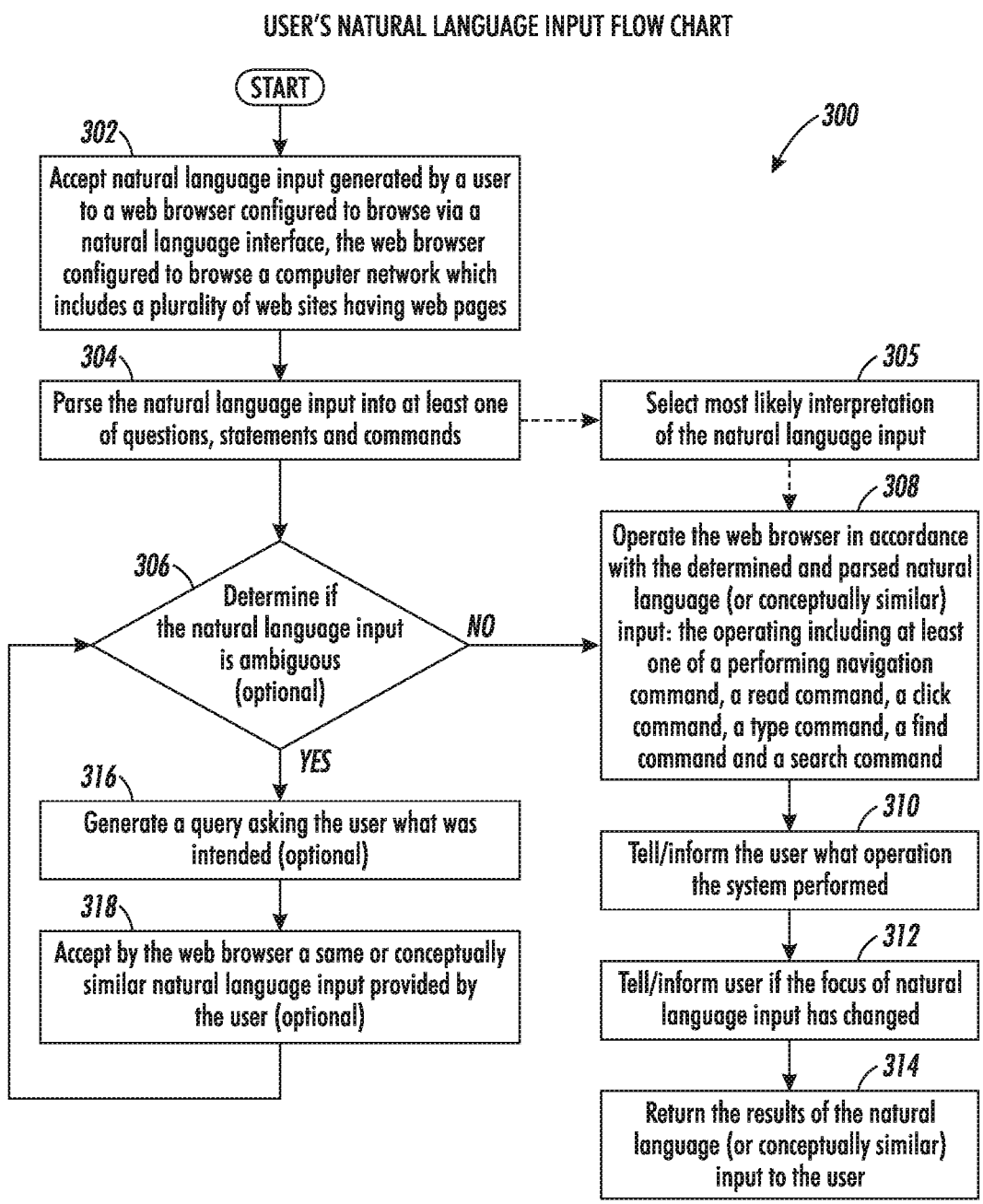
FIG. 3 provides a user's natural language input flow diagram for a system according to the present application.

Turning to FIG. 3, illustrated is an overview of a system and process 300 including at least a web browser configured to operate according to natural language inputs (and computing devices, which have input and output components that in one embodiment provide a manner of inputting verbal instructions and a computerized voice output). Generally, the system and/or process of FIG. 3 may be accomplished within arrangements such as shown in FIGS. 1 and 2.

Following the start operation in FIG. 3, the web browser accepts a natural language input generated by a user via a natural language interface 302. The natural language interface can be a voice interface or a chat interface. The web browser is configured to browse a computer network, such as the Internet, which includes a plurality of web sites having a multitude of web pages. Once accepted, the natural language input is parsed into at least one of questions, statements and commands 304.

In one embodiment, following the parsing operation, the process reaches a question statement to determine if the natural language input is ambiguous 306. If it is determined the natural language is not ambiguous, the process moves (NO) to step 308, where the web browser is operated in accordance with the determined and the parsed natural language input. The operating of the web browser includes at least one of performing a navigation command, a read command, a summarize command, a click command, a type command, a find command, and/or a search command. Thereafter the process may instruct the system to tell/inform the user what operation the system performed 310. Next, the system tells/informs the user if the focus of the natural language input has changed 312. Finally, the process instructs the system to return the results of the natural language to a user 314, which may be in the form of a computer generated voice output or may be in the form of text.

The concept of "focus" in a standard existing web browser is directed to a location on the relevant web page where characters are placed when a user begins typing e.g., a text box. There is usually a blinking character or other element to identify this location.

While in the present application "focus" may include the above understanding it is not limited to this understanding. Rather herein a focus may be on a web page button, on a piece of text or section, among other areas of a web page. Therefore in the present application "focus" has an expanded use.

Returning to process step 306, should the results of determining whether or not the natural language input is ambiguous is positive (YES), the system then generates a query asking the user what was intended by the natural language input 316. At this point, the user inputs a same or conceptually similar natural language input that has been provided in response to the query 318. The conceptually similar natural language input may include acceptance, selection or rejection of one or more options provided by the system. At this point, the process moves back to step 306 to again inquire whether the now existing natural language input is or is not ambiguous. When the results are still ambiguous, the process continues in the foregoing loop of steps 306, 316, 318. On the other hand, once the ambiguity has been eliminated, the process moves to steps 308-314, where the same or conceptually similar natural language input is processed. In an alternative design the mentioned loop may also be designed to ask X number of times and then when that number is met, the process will use the determined most likely meaning and then move forward with the process.

It is to also be appreciated flow chart 300 of FIG. 3 can operate in a manner where steps 306, 316 and 318 are optional. Particularly, in certain embodiments the process does not need to test to see if the natural language input is ambiguous. Rather, the process can move directly from step 304 to step 305 and then directly to step 308 as shown by the dotted lines. In this embodiment the process selects the most likely interpretation of the natural language input without making additional inquiries to the user. This operation will employ a test that for example matches the user input using a natural language parser, which then rates the potential meanings. The process selects the highest rated result and moves forward.

In this situation, the process will make its best estimate or interpretation of the meaning of the natural language input and then move forward to steps 308-314 using the best estimated meaning without requiring or asking for additional clarification from the user.

Figure 4:
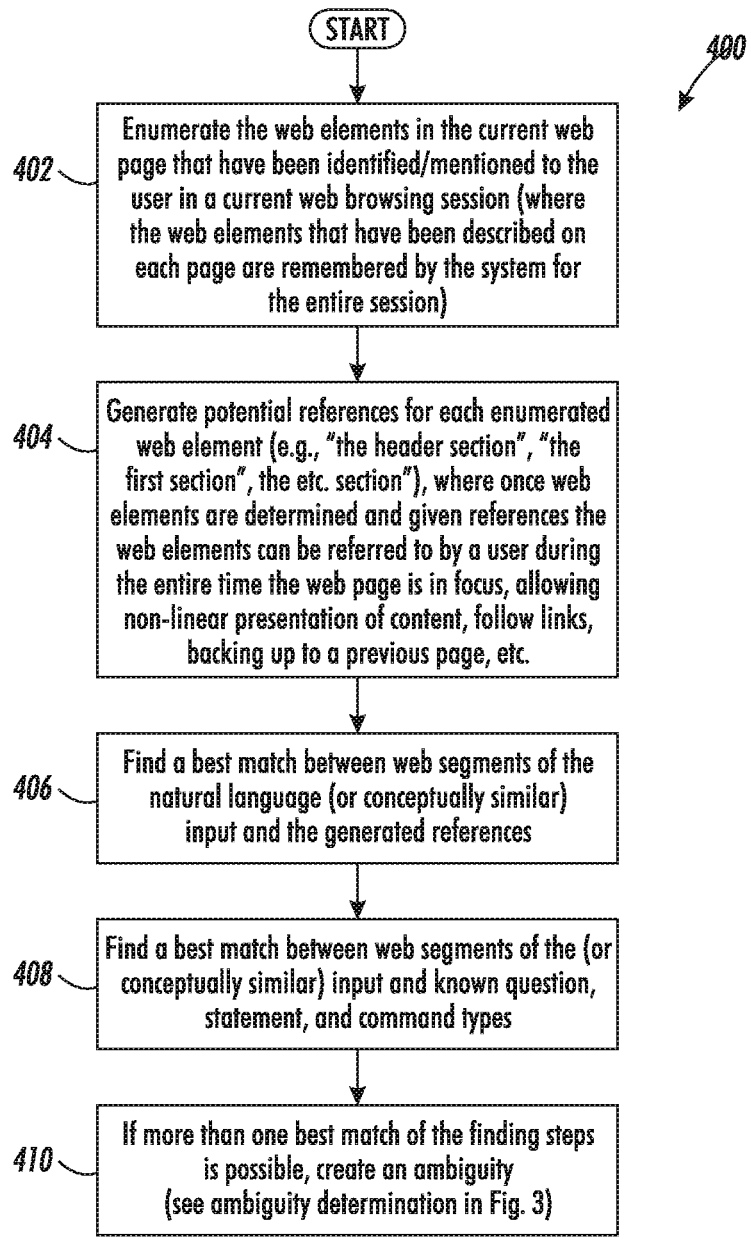
FIG. 4 is a flow diagram showing a parsing of a natural language input according to the present application.

Having described the overall process the parsing of step 302 is now described in more detail in FIG. 4 by flowchart 400. Particularly, following a start of the process, web elements (e.g., "the header section", "the first section", "the etc. section") in the current web page that have been identified/mentioned to the user in a current web browsing session are enumerated 402. The process then generates potential natural language references for each enumerated web element 404. Thereafter, once the potential natural language references have been enumerated, the process finds a best match between segments of the natural language (or conceptually similar natural language) input and the generated potential references 406. The process next finds a best match between segments of the natural language (or conceptually similar natural language) input and the known or input question, statement and/or command types 408. Thereafter, if it is found that more than one best match of the finding steps is possible, an ambiguity determination is created, such as discussed in connection with FIG. 3 (410). It is to be appreciated however that step 410 is optional when the system is accepting the best possible match without requesting further clarification by a user, such as discussed in connection with FIG. 3. The "best match(es)" mentioned above may be found in one embodiment by use of a rating algorithm.

It is noted the potential references are regenerated every time a new user input is provided to allow for new web elements.

With further attention to the described parsing, there are other possible ways of interpreting the user's input. One way is to parse the user's input into a semantic representation of what the user said, and then try to interpret the semantic representation logically based on the current state of the conversation. So, if the user said "go to the first section", this would be interpreted as GoTo(First(Section)). The process then acts to determine what First(Section) meant in the current context, and then the process goes to that section (e.g., say, Section_143). Another way is to use machine learning to map from user inputs to semantic representations using well-known techniques such as deep learning. In some embodiments, a preferred implementation for interpreting the user's input is the one described above: to use a fuzzy match to match part of the user's input against descriptions of commands and web elements that have been pre-computed. So, if the user said "go to the first section", the process would look for "the first section" in a list of possible web element descriptions and find that it best matched Section_143. It would then look up "go to <Section>" and discover that this best matched the GoTo command. This would produce GoTo(Section_143). In one embodiment the fuzzy matching scores a match based on various factors such as how many words overlap between the user's input and the pre-computed descriptions, the importance of the words, and how the words get reordered between the user's input and the pre-computed descriptions.

Turning to the issue of finding more than one best match which causes an ambiguity (see FIGS. 3 and 4), this ambiguity may be found when there is more than a single best match when (i) finding a best match between segments of the natural language input and the generated potential references as well as when the process is (ii) finding a best match between the segments of the natural language input and known question, statement, and command types.

So as an example of the (i) situation, it is supposed a user inputted: "click on the button", and there are two buttons that have been identified. The present natural language web browser will come back and ask: "Did you mean the 'X' button, or the 'Y' button?" The other possibility is if the command from the user is "push" the button. If it is not completely identified what "push" means, the system may identify that as a "click" operation, and the operation of the system will move forward.

Figure 5:
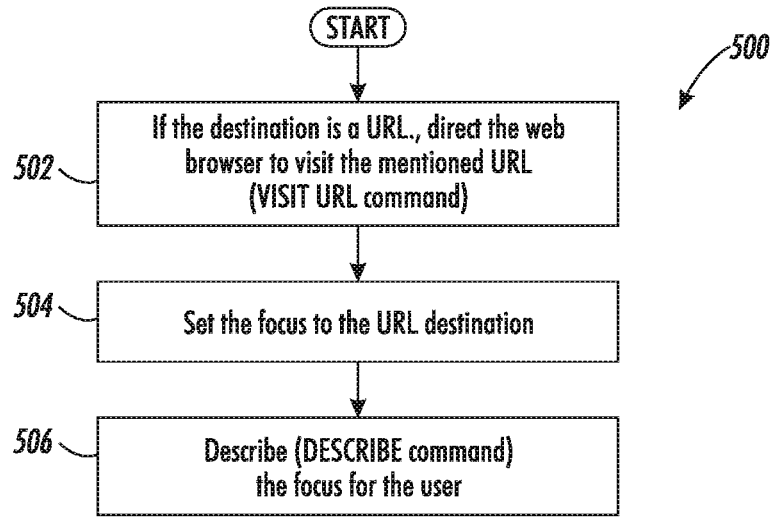
FIG. 5 is a flow diagram showing a navigation operation according to the present application.

Turning to FIG. 5, provided is a flow diagram 500 which is a navigation process expanding upon the navigation concept discussed in connection with step 308 of FIG. 3. In this embodiment, the navigation command (e.g., "go to www.Amazon.com", "go to the header section", etc.) is described. In step 502, following the start operation, when the destination is a URL address, the web browser is directed to visit the mentioned URL (e.g., a VisitURL command). At this point, the process will set the focus of the system's operation to be a URL destination address 504, and thereafter, a Describe command is implemented to describe the focus to the user 506.

Figure 6:
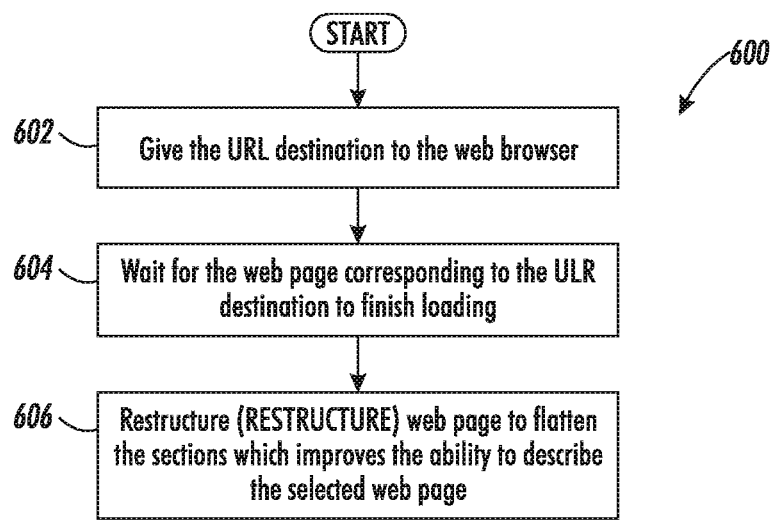
FIG. 6 is a flow diagram illustrating the operations to visit a URL according to the present application.

Turning to FIG. 6, a more detailed description of the "VisitURL" operation is shown in flowchart 600, wherein following the start operation, the URL destination is given to the web browser 602, and in the next step, the system waits for the web page corresponding to the URL destination to finish loading 604. Thereafter, the process operates to restructure the web page that is the URL destination to flatten the sections, thereby improving the ability to describe the selected web page 606. It is understood the flattening of the sections refers to removal of stylistic choices, un-needed structure, etc. and is focused on a minimalist approach which simplifies the layout and page structure.

Figure 7:
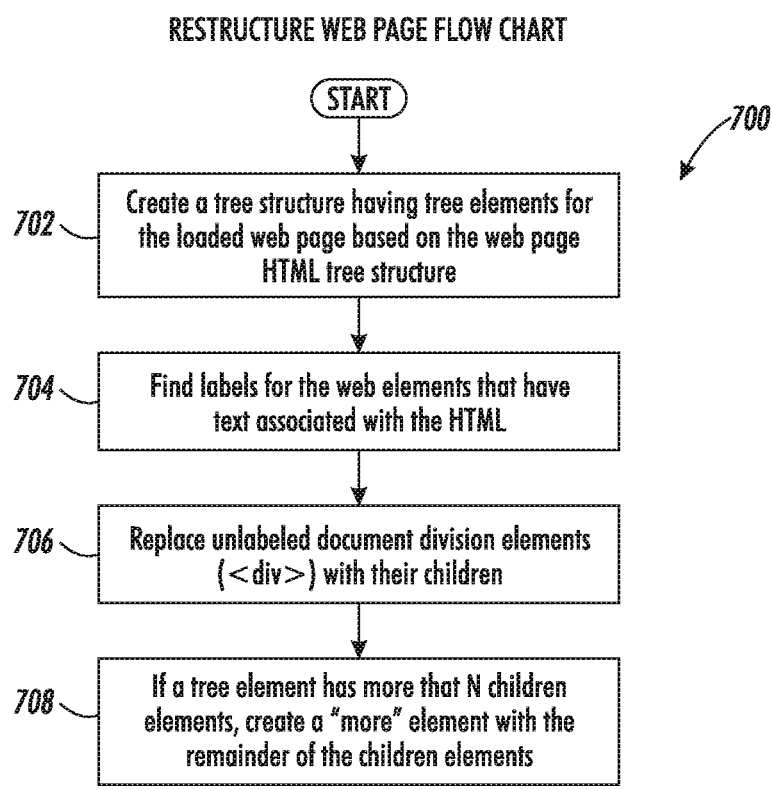
FIG. 7 is a flow diagram illustrating the restructuring of a web page in accordance with the operations of the present application.

Next, a process for the restructuring of web page is shown in FIG. 7 as flow diagram 700, which expands on this concept discussed in connection with step 606 of FIG. 6. After the start operation, the process creates a tree structure having tree elements for the loaded web page, based on the web page HTML tree structure 702. Then labels are found for the web elements that have text associated with the HTML 704. The process then replaces unlabeled document division elements (<div>) with their children 706. Thereafter, if a tree element has more than N children elements, the system will create a "more" element with the remainder of the children elements 708. In FIG. 7, the number N is a tradeoff between giving the user more information and overwhelming the user with information. For speech operations, N might be between 3 and 5. For a chat interface, N might be between 5 and 10.

With regard to an embodiment of the present discussion a concept is to find natural language labels in the HTML that can be used to describe the web page elements. To do this, special attributes in the HTML are searched for, such as titles and ARIA-labels. (ARIA is a web standard for making Web applications more accessible to people with disabilities.). If the page element is a button or link, then the text of the page element is used as the label. In some embodiments the label is determined by the type of web element. For instance, if the web element is a HTML5 semantic element, such as header or footer, then "header" or "footer" is used as the label. If the web element has an ARIA role of navigation, then the ARIA role is used as the label. If the web element has a special id such as "main", then it is used as the label. It is noted a "role" of an ARIA role, is an attribute and the values it can have provides information about the purpose of an element in question (is it navigation? Main data? Or tangential content?). Assistive technologies can use this information to jump directly to the main content, immediately detect the main navigation of the document, etc.

With additional attention to restructuring of the web page, in certain embodiments if a section is unlabeled, and the "first element" is a short text element (e.g., less than 20 characters) and the second element is not a short text element then the first element is used as the label of the section. If a header element (e.g. <h1>) is followed by a mixture of non-header elements and header elements with higher numbers (e.g. <h2>, <h3>), then the process creates a section that has the first header element as its label and the remaining elements as its children.

Figure 8:
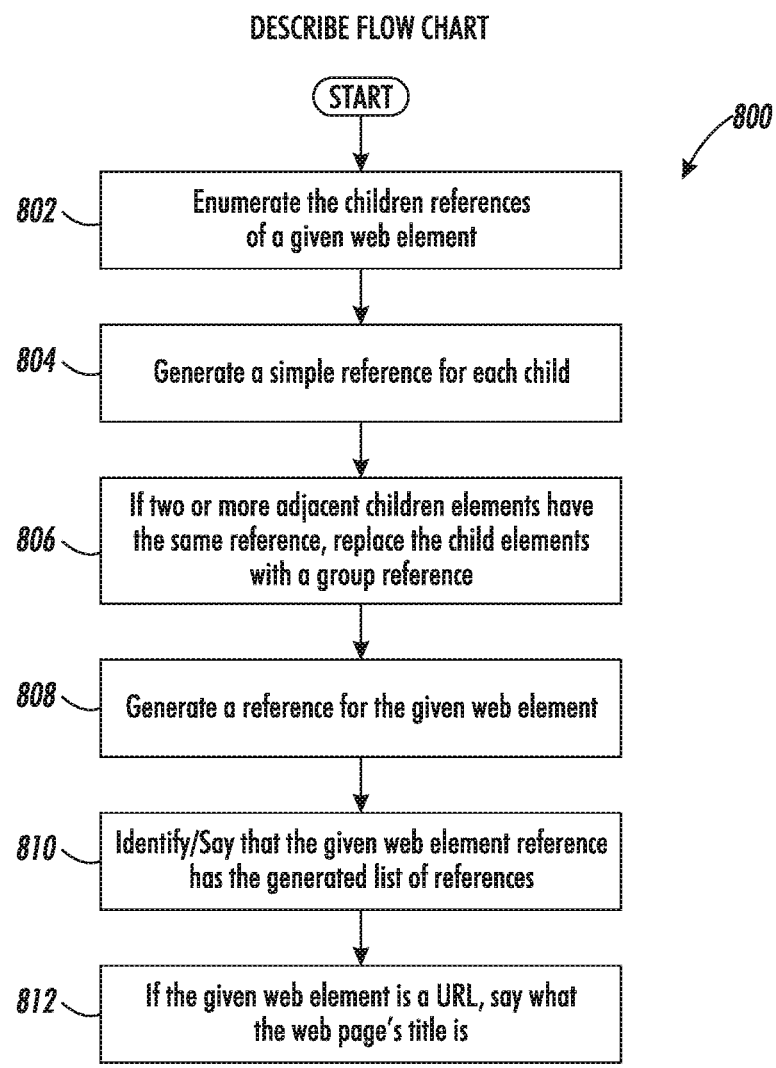
FIG. 8 is a flow diagram illustrating the processes for undertaking a described operation according to the present application.

Turning now to FIG. 8 provided is a flow chart 800 used to employ the "describe" process discussed in connection, for example, with FIG. 3. Following the start operation of this process, the children of a given web element in the restructured HTML tree are enumerated 802. Thereafter, a simple natural language reference for each child element is generated by the system 804. Then, if it is determined two or more adjacent children elements have the same natural language reference, the process will replace these children elements with a web element reference 806. Thereafter, the process generates a natural language reference for the given web element 808, and the system then identifies or states that the given web element natural language reference has a generated list of natural language references 810. Finally, if the given web element is a URL, the web page will announce or say the title (e.g., "Title Page 12").

It is to be understood that step 806 is an optional operation in that in situations where there is not more than two or more adjacent children elements, then there will be no group reference generated.

Figure 9:
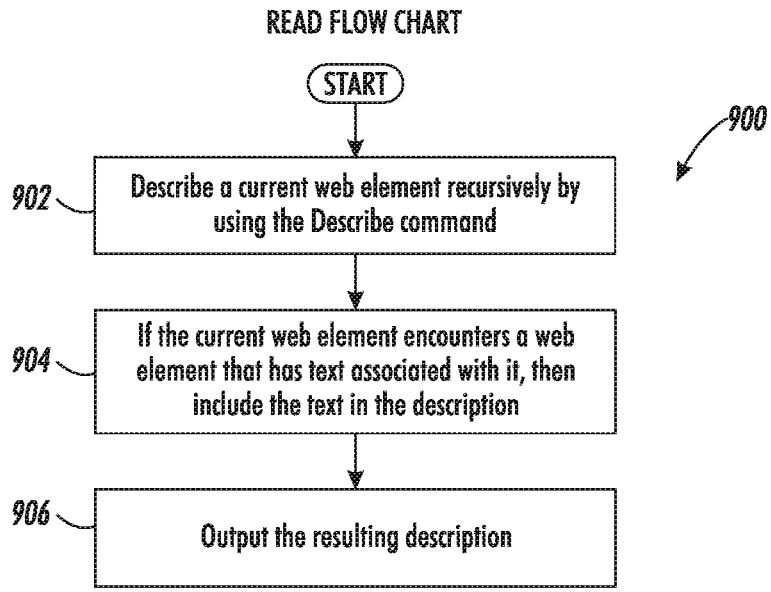
FIG. 9 is a flow diagram illustrating a read operation according to the present application.

Turning to FIG. 9, illustrated is a read flowchart 900 which describes the process for a Read command previously mentioned in FIG. 3. Following the start of the process, the process describes the current web element recursively using the Describe command given above 902. If it encounters a web element that has text associated with it, then it will include the text in the description 904. The output is the resulting description 906.

Figure 10:
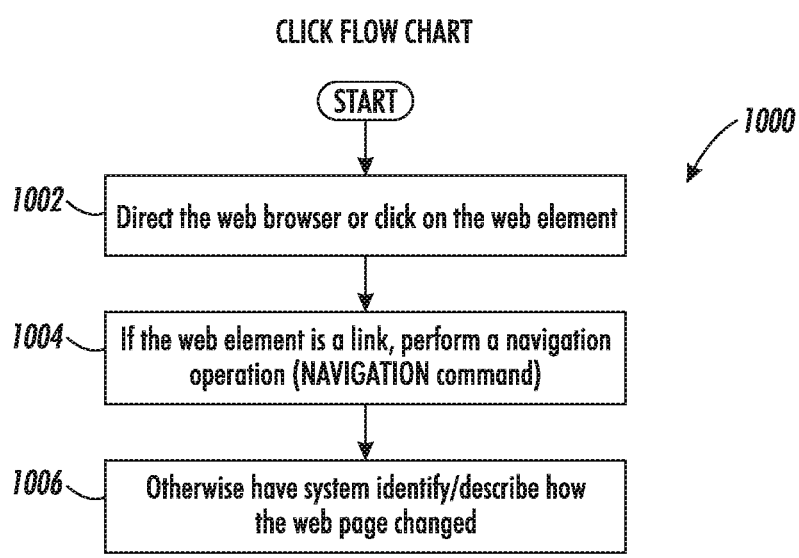
FIG. 10 illustrates a flow diagram for a click operation according to the present application.

Turning to FIG. 10, illustrated is a flow chart 1000, which illustrates the process for the Click command previously mentioned in connection with step 308 of FIG. 3. Particularly, following the start of the process, the web browser is directed to click on the web element 1002. This would occur by natural language inputs supplied by a user. Thereafter, it is determined by the process that if the web element is a link, the process will perform a navigation operation such as previously discussed (i.e., VisitURL) 1004. Finally, otherwise the process will have the system identify/describe to the user how the web page has changed 1006.

Chronologically, the process of the described natural language web browser operates to (i) restructure the web page, (ii) give the restructured web page a description, (iii) match the user's input against the description, and (iv) provide additional information from the web page to the user. These steps are repeated until the user receives the information that is being sought.

Having described operations of the natural language web browser, examples of how those operations may be implemented are described below.

EXAMPLE

The user says "Go to www.uspto.gov".

The system parses this into a VisitURL command with the URL "www.uspto.gov".

The system directs the web browser to go to www.uspto.gov.

The system converts the resulting HTML into a tree structure, the top level of which looks something like the following after restructuring:

```
<body title = "United States Patent and Trademark Office">
<a href="#main">Jump to Main Content</a>
<header> ... </header>
<div id ="main">
  <div title="Learn About the Process"></div>
  <div title="News and Updates"> ... </div>
  <div title="Fees and Payments">
    <a href="http://www.uspto.gov/learning-and-resources/fees-and-payment">Fees and Payments</a>
    <p>Pay fees and learn more about filing fees and other payments.</p>
  </div>
  <div title="Patents & Trademarks Initiatives"> ... </div>
<div title="Greater Understanding"> ... </div>
</div>
<footer> ... </footer>
</body>
```

The system sets the focus to the top node in this tree.

The system creates a description of the current focus that includes references for the focus and each of its children.

The references are based on the types, titles, and texts of each element.

The system returns the following to the user:

You are at www.uspto.gov.

www.uspto.gov's title is United States Patent and Trademark Office.

www.uspto.gov has a "Jump to Main Content" link, a header section, a main section and a footer section.

The user says "Go to the main section".

The system enumerates web elements in the current web page that have been mentioned in this session. There are five: the URL, the "Jump to Main Content" link, the header section, the main section, and the footer section.

The system generates multiple natural language references for each mentioned web element. For instance, it generates "the main section", "the first section", and "the section" as possible natural language references for the main section.

The system then matches "the main section" in the natural language input with "the main section" in the generated references.

The system thus parses the user's input into a GOTO command with the main section as its argument.

The system sets the focus to the main section.

The system creates a description of the current focus.

The system returns the following to the user:

You are at the main section.

The main section has a Learn About the Process section, a News & Updates section, a Fees and Payment section, a Patents & Trademarks Initiatives section and a Greater Understanding section.

The user says "Go to the third section".

The system enumerates the web elements in the current web page that have been mentioned in this session.

The system generates multiple references for each mentioned web element. For instance, it generates "the Fees and Payment section", "the third section", and "the section" as possible references for the main section. (It only generates short references like "the section" or "the third section" for elements in the most recent turn.)

The system matches "the third section" in the user's input with "the third section" of the Fees and Payment section.

The system thus parses the user's input into a GOTO command with the Fees and Payment section as its argument.

The system sets the focus to the Fees and Payment section.

The system returns the following description to the user:
You are at the Fees and Payment section.
the Fees and Payment section has a "Fees and Payment" link and a paragraph.

The user says "Read the paragraph".

The system parses the user's input into a READ command with the paragraph as an argument.

The system returns the following to the user:
The paragraph in the Fees and Payment section says: Pay fees and learn more about filing fees and other payments.
You are at the paragraph in the Fees and Payment section.

The user says "Click on the link".

The system parses the user's input into a CLICK command with the Fees and Payment link as an argument.

The system directs the web browser to go to www.uspto.gov/learning-and-resources/fees-and-payment.

The system converts the resulting HTML into a restructured tree structure.

The system sets the focus to the top node of the restructured tree structure.

The system creates a description of the current focus.

The system returns the following to the user:
I clicked on the "Fees and Payment" link.
You are at www.uspto.gov/learning-and-resources/fees-and-payment.
www.uspto.gov/learning-and-resources/fees-and-payment's title is Fees and Payment|USPTO.
www.uspto.gov/learning-and-resources/fees-and-payment has a "Jump to Main Content" link, a header section, a main section and a footer section.

To further describe the present application, provided below is a command list that is available to the user:
next: go to page element after the current page element
down: go to the first daughter of the current page element
up: go to the parent of the current page element
back: go the last page element visited
go to PageElement: go to the page element named
find ElementType: find the next page element of the given type
find Words: find the next page element that contains the given words
search for Words: search for the given words using the page's search form
describe PageElement: describe the top level of the page element named
describe all PageElement: describe all of the page element named
read PageElement: read the text of the page element named
summarize PageElement: summarize the text of the page element named
click PageElement: click on the button named
type Words: type the given words into the current input box
submit PageElement: submit the given form
"PageElement" is a descriptor for an element on the page (e.g. the header section, the first link, the button),
"ElementType" is the name of the type of a page element (e.g. button, form, input box, label, link, list, menu, section, paragraph),
"Words" is one or more words.
Examples using up, down, next, and back:
User: goto www.uspto.gov
System: You are at www.uspto.gov.
www.uspto.gov's title is United States Patent and Trademark Office.
www.uspto.gov has a "Jump to Main Content" link, a header section, a main section and a footer section.
User: down
System: You are at the "Jump to Main Content" link.
User: next
System: You are at the header section.
the header section has a "United States Patent and Trademark Office—An Agency of the Department of Commerce" link, a menu, a navigation section and two lists.
User: next
System: You are at the main section.
the main section has a Learn About the Process section, a News & Updates section, a Fees and Payment section, a Patents & Trademarks Initiatives section and a Greater Understanding section.
User: back
System: You are at the header section.
User: up
System: You are at www.uspto.gov.
User: find payment
System: You are at the Fees and Payment section.
the Fees and Payment section has a "Fees and Payment" link and a paragraph.

From the foregoing, the described natural language web browser allows a user to interact in a conversational manner. Consider the following interaction with a general web page.
  USER: go to radar.oreilly.com
  SYSTEM: I see a navigation bar across the top, a list of categories below that, and in the main body is a list of articles. Also on the right side there are links to Featured Video, Featured Download, and Most Recently Discussed items.
  USER: What's the featured video?
  SYSTEM: The featured Video is "O'Reilly's Learning Paths will help you get where you want to go, whether it is learning a programming language, developing new skills, or getting started with something entirely new." There is a link on the words 'Learning Paths'.
  USER: Go to the first article.
  SYSTEM: Alright. The first article is titled "A world of continuous partial employment." There is an image and then the text of the article. Would you like me to read the article or summarize it?

In view of the forgoing disclosures it is to be appreciated that when the process arrives at the selected web page, the whole page is not initially described to a user. Rather, the process gives the user high level information (such as there is a header section, a main section, a first section, a second section, etc.). Then through natural language inputs a user interacts with the web browser asking the web browser to provide more information about a particular section. For example, a user may input: "Tell me more about the second section", which takes the user to the second section of the particular web page. Once the user is within the second section, additional user inputs will obtain more information, so eventually by querying the web browser about the web page; the user is exposed to more and more information.

The top level description is not always header, main and footer sections, it depends on the page setup. Some pages do not have headers and footers, so the process will work with what is available on the web page. This is done automatically by the web browser.

HTML5 has certain header sections, which will define whether something is a search function, a header function, or other item. So in certain embodiments the meaning attached to each section from the HTML is used to advantage.

A particular aspect of the present application is that a user inputs a URL destination and the system takes the user to the web page at that URL. Therefore in one embodiment in order to undertake searching on a search engine (e.g., GOOGLE, Yahoo, Bing, or others search engines). The user can, for example, say "Go to Google.com" or any other search engine. When this is accomplished and the user is at the landing page of the search engine. The user inputs a search (e.g., saying: "search for auto dealers"). At this point the present system would find a search box of the search engine to enter that phrase. The user can then say to go to or activate the search button and then a search would be undertaken. Once the search results are returned the system will say, "There is a header, a main section and a footer section." Instructing the process to go to the main section results in a list of items (e.g., the search results returned by the Google search). The system can then be told to start reading the results (where there will be a link to an auto dealer website). At that point the user can then drill down to obtain more information at the auto dealer site.

In embodiments where the web browser is built from scratch according to the present concepts, a web browser with full functionality may not be obtained (for example it may not have multi-search engines capabilities, bookmarks or tabs). However, those capabilities can be added. Also, when the concepts of the present application are incorporated into existing web browsers such full functionality would exist and natural language interfaces to them could be added.

Up until this point, the web browsers operate without any specialized knowledge of the web site being visited. It only depends on the HTML that is produced by the web site. However, in other embodiments natural language interfaces may be added that know about the web site being visited. For instance, when visiting www.uspto.gov, the present disclosure could handle "What is the current status of my patent application?" by asking the user for some information and then taking the user to the correct web page.

It is also to be appreciated, while in the foregoing the processing of inquiries has been described generally being processed as part of the web browser itself, in other embodiments the processing of the user inputs is accomplished by forwarding the inputs to an external server where the processing is accomplished and the results are returned to the system.

Again as a summary of certain embodiments, the natural language (conversational) web browser receives chat input and/or voice input from the user and produces chat output or voice output as a response. When the user first visits a web page, the natural language web browser analyzes the structure of a web page to determine a partial description of it for the user. The user can then ask for more information about the web page based on the partial description, and the natural language web browser will provide more detail. The user can ask for more information about this new description, and so on. The user can also enter text, click on buttons, and follow links to other web pages. Thus, the natural language web browser with interface is configured to provide a partial description of a web page that can be expanded when the user asks for more information. This involves determining a short, useful description based on the web page structure and also figuring out which parts of the description that the user wants more information about based on their input.

It is to be noted that in the present disclosure the system remembers the web elements that have been described on each page for the entire session. Once the web elements have been determined and given references, a user can refer to them during the entire time the web page is in focus. This allows non-linear presentation of content of the web page. It can also include following links, backing up to a previous page and thus have the prior context restored. Of course, the user can ask for the parsed elements again, but if they remember the page, then can just resume the interaction on that page.

Aspects of the present disclosure include making it easier for the blind to access web pages. It allows people who need their hands free for other purposes to use the web. It makes it possible to access web pages from chat interfaces and devices with very small or non-existent screens (such as watches). Finally, it means that web sites do not need to do anything special to be accessed by voice and/or chat interfaces.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A natural language web browsing method, comprising:
accepting by a web browser a first natural language input, the web browser configured to browse a computer network including a plurality of websites having web pages;
finding a best match to the first natural language input based on a match to the same, or conceptually similar, language;
parsing the best match to the first natural language input into at least one of a question, a statement, and a command;
operating the web browser in accordance with the first parsed natural language input, wherein the first parsed natural language input that the web browser is operated in accordance with includes one of a first navigation command, a first read command, a first summarize command, a first describe command, a first click command, a first type command, a first find command, and a first search command;
returning at least one result from the operating the web browser in accordance with the first parsed natural language input, wherein the operating the web browser is accomplished by use of at least a digital processing device;
accepting by the web browser a second natural language input corresponding to one of the at least one result of the first natural language web browsing;
parsing the second natural language input into at least one of a question, a statement, and a command;
operating the web browser in accordance with the second parsed natural language input, wherein the second parsed natural language input that the web browser is operated in accordance with includes one of a second navigation command, a second read command, a second summarize command, a second describe command, a second click command, a second type command, a second find command, and a second search command; and returning at least one result from the operating the web browser in accordance with the second parsed natural language input, wherein the operating the web browser is accomplished by use of at least a digital processing device.

2. The method of claim 1 further including:
determining that the first natural language input is ambiguous;
in response to the determination that the first natural language input is ambiguous:
generating a query asking what was meant by the first natural language input;
accepting, by the web browser, the best match to the first natural language input in response to the query.

3. The method of claim 2 comprising the operating of the web browser in accordance with at least one of the first parsed natural language input and the same or conceptually similar natural language input, without limiting access to web sites on the world wide web.

4. The method of claim 3 wherein the operating includes navigating directly to a particular web page on the world wide web not restricted by the method to a preset number of web sites.

5. The method of claim 1 further including providing information related to actions of the web browser that occurred during the natural language web browsing.

6. The method of claim 5 further including providing information in response to a determination that a current focus of the web browsing has changed.

7. The method of claim 1 wherein the parsing includes:
enumerating web elements of a current web page that has been identified in a current web browsing session;
generating potential references for each enumerated web element;
finding a second best match between segments of the first natural language input and the generated potential references;
where finding the best match to the first natural language input based on a match to the same, or conceptually similar language includes finding a best match between the segments of the first natural language input and known question, statement, and command types; and
creating an ambiguity in response to a determination that more than one best match of the finding step is possible.

8. The method of claim 7 wherein:
the enumerated web elements include at least one of a header section, a first section, and a second section; and
the first natural language input is received from a device that does not have an electronic display.

9. The method of claim 1 wherein the navigation command is performed by:
directing the web browser to visit a destination named by a universal resource locator (URL) when the destination of the navigation command is a URL destination;
setting a focus to the URL destination; and
describing the focus to a user.

10. The method of claim 9 wherein visiting the URL destination includes:
giving the URL destination to the web browser;
loading a selected web page corresponding to the URL destination; and
restructuring the selected web page to improve an ability to describe the selected web page.

11. The method of claim 10 wherein restructuring the selected web page includes:
creating a tree structure, having tree elements, for the loaded web page based on HTML of the tree structure;
finding labels for tree elements in the HTML of the loaded web page;
replacing at least one unlabeled HTML document division element with children of the at least one unlabeled HTML document division element; and
for a tree element having more than N children, creating a more element with the remainder of children elements.

12. The method of claim 1 wherein the describe command further includes:
enumerating children of a given web element;
generating a simple reference for each child;
generating a reference for the given web element;
identifying that the given web element reference has a generated list of references; and
in response to the given web element being a URL, identifying a title of the web page.

13. The method of claim 12 further comprising:
determining that two or more adjacent children have a same reference, and
in response to the determination that two or more adjacent children have the same reference, replacing the two or more adjacent children with a group reference.

14. The method of claim 1 wherein the read command further includes:
recursively describing a web element; and
including the text of any web element encountered that has a text associated with the encountered web element.

15. The method of claim 1 wherein the first natural language input includes a question, statement, or command that is specific to the web site currently being visited.

16. The method of claim 1 wherein the first click command further includes:
directing the web browser to click on a web element based on the first parsed natural language input;
performing a navigation operation when the web element is a link; and
otherwise identifying how the web page changed.

17. The method of claim 1 wherein the first click command is a click command executed by the web browser, on a first web page, based on the first parsed natural language input; and
the second click command is a click command executed by the web browser, on a second web page, based on the second parsed natural language input, wherein the first web page and second web page can be the same.

18. The method of claim 1, wherein the first click command is digitally executed by the web browser.

* * * * *